United States Patent [19]

Parsekian

[11] Patent Number: 4,585,202

[45] Date of Patent: Apr. 29, 1986

[54] ANTI-THEFT LOCKING DEVICE

[76] Inventor: Peter M. Parsekian, 16 Fairlawn St., Ho-Ho-Kus, N.J. 07423

[21] Appl. No.: 731,842

[22] Filed: May 8, 1985

[51] Int. Cl.$^4$ ............................................. F16M 13/00
[52] U.S. Cl. ...................................... 248/553; 70/58; 248/500; 248/680
[58] Field of Search ............... 248/553, 551, 500, 503, 248/506, 680, 681; 70/58; 211/4

[56] References Cited

U.S. PATENT DOCUMENTS

| | | | |
|---|---|---|---|
| 3,965,705 | 6/1976 | Nadler | 248/553 X |
| 4,028,913 | 6/1977 | Falk | 70/58 |
| 4,367,572 | 1/1983 | Zielenski | 248/503 X |
| 4,520,887 | 6/1985 | DiFazio | 248/503 X |

Primary Examiner—Ramon S. Britts
Assistant Examiner—Ramon O. Ramirez
Attorney, Agent, or Firm—Samuelson & Jacob

[57] ABSTRACT

An anti-theft locking device for securing computer-related units against unauthorized removal from a work station utilizes a base frame anchored to a work surface at the work station and constructed to receive one of the units in nested position so as to preclude movement of the unit in directions parallel to the work surface and to receive a hold-down frame placed over the units and secured to the base frame with screw-type locking mechanisms extending into the base frame beneath the nested unit to protect the screw-type locking mechanisms from tampering and to conserve space at the work station.

17 Claims, 7 Drawing Figures

ANTI-THEFT LOCKING DEVICE

The present invention relates generally to security devices and pertains, more specifically, to anti-theft locking devices for securing electronic equipment, such as computers and computer-related units, against unauthorized removal from a specified work station.

The current proliferation of electronic equipment in a variety of work places in business organizations, professional offices and educational institutions has rendered such equipment easily accessible to larger numbers of individuals. Computers and computer-related units, such as display terminals, printers, plotters and the like are readily accessible and, in view of the immediate resale value of such equipment, that equipment now must be protected against theft and other unauthorized removal, while still remaining easily usable when installed at a work station. While a great many security devices have been made available in the past for deterring the theft of various business machines, the high cost and great popularity of current computer equipment requires devices which provide a higher degree of security, while minimizing any inconvenience in using or maintaining the protected equipment and keeping costs within reason.

A security device for computers and computer-related equipment is disclosed in U.S. Pat. No. 4,453,692 wherein there is illustrated a device having a frame structure fitted over a single unit of equipment and locked to a desk top or table top by studs and padlocks. While such an arrangement provides a more-or-less convenient and effective means for securing a unit of equipment, the arrangement nevertheless exposes the studs and padlocks to tampering, from either above or below the desk top or table top, and offers only limited protection against common methods used by thieves in dealing with padlock-secured devices. Furthermore, the illustrated arrangement tends to be rather bulky, requiring space at either side of the protected equipment for the studs and padlocks.

It is an object of the present invention to provide a more secure arrangement by which one or more pieces of equipment, such as computers and computer-related units, are secured against unauthorized removal from a selected work station.

Another object of the invention is to provide an anti-theft device for electronic equipment, such as computer and computer-related units, which is easy to install and use with minimal intrusion on the work space and essentially no interference with the normal operation and use of the secured equipment.

Still another object of the invention is to provide an anti-theft device of the type described and which is removed and replaced readily by authorized personnel for ease of equipment maintenance and replacement.

Yet another object of the invention is to provide an anti-theft device of the type described and which incorporates an arrangement adapted for use with any units of equipment selected from the very wide variety of currently available equipment, with maximum security at a reasonable cost.

A further object of the invention is to provide an anti-theft device of the type described and which resists tampering and deters unauthorized removal of secured equipment while requiring only simple installation procedures so as to encourage use of the device.

Still a further object of the invention is to provide an anti-theft device of the type described and which utilizes currently available locking devices for economy and ease of use.

The above objects, as well as still further objects and advantages, are attained by the present invention which may be described briefly as an anti-theft locking device for use primarily in connection with electronic equipment to be secured to a work surface against unauthorized removal, the device engaging the equipment along selected securement areas thereof while enabling access to use areas of the equipment for use of the equipment when secured, the device comprising: a base frame having basal surfaces for resting upon the work surface, support surfaces spaced above the basal surfaces, and a peripheral wall defining a secure space bounded by the peripheral wall and extending between the basal surfaces and the support surfaces, the support surfaces including support portions complementary to corresponding selected areas of the equipment such that upon placement of the equipment upon the support surfaces of the base frame the corresponding selected securement areas of the equipment will be in a nested position within the peripheral wall, with the peripheral wall precluding movement of the equipment in directions parallel to the work surface; a hold-down frame for placement over the equipment, the hold-down frame including restraining members generally complementary to further selected securement areas of the equipment while enabling access to the use areas, and at least two depending legs for straddling the equipment and extending downwardly into juxtaposition with the peripheral wall of the base frame when the hold-down frame is in place over the equipment, each depending leg including a distal end, and a laterally-extending opening adjacent the distal end of at least one of the depending legs; a threaded aperture aligned laterally with the opening located adjacent the distal end of the one of the depending legs when the depending legs are juxtaposed with the peripheral wall of the base frame; a screw-type locking mechanism having a lock housing and a threaded shaft rotatable relative to the lock housing, the screw-type locking mechanism being complementary to the opening adjacent the distal end of the one of the depending legs such that upon engagement of the threaded shaft within the threaded aperture, the screw-type locking mechanism will be seated in the opening to secure the hold-down frame to the base frame, thereby precluding release of the equipment from the nested position in the base frame; and anchoring means on the base frame and located within the secure space for anchoring the base frame to the work surface.

The invention will be understood more fully, while still further objects and advantages will become apparent, by reference to the following detailed description of preferred embodiments thereof illustrated in the accompanying drawing in which.

Figure 1:
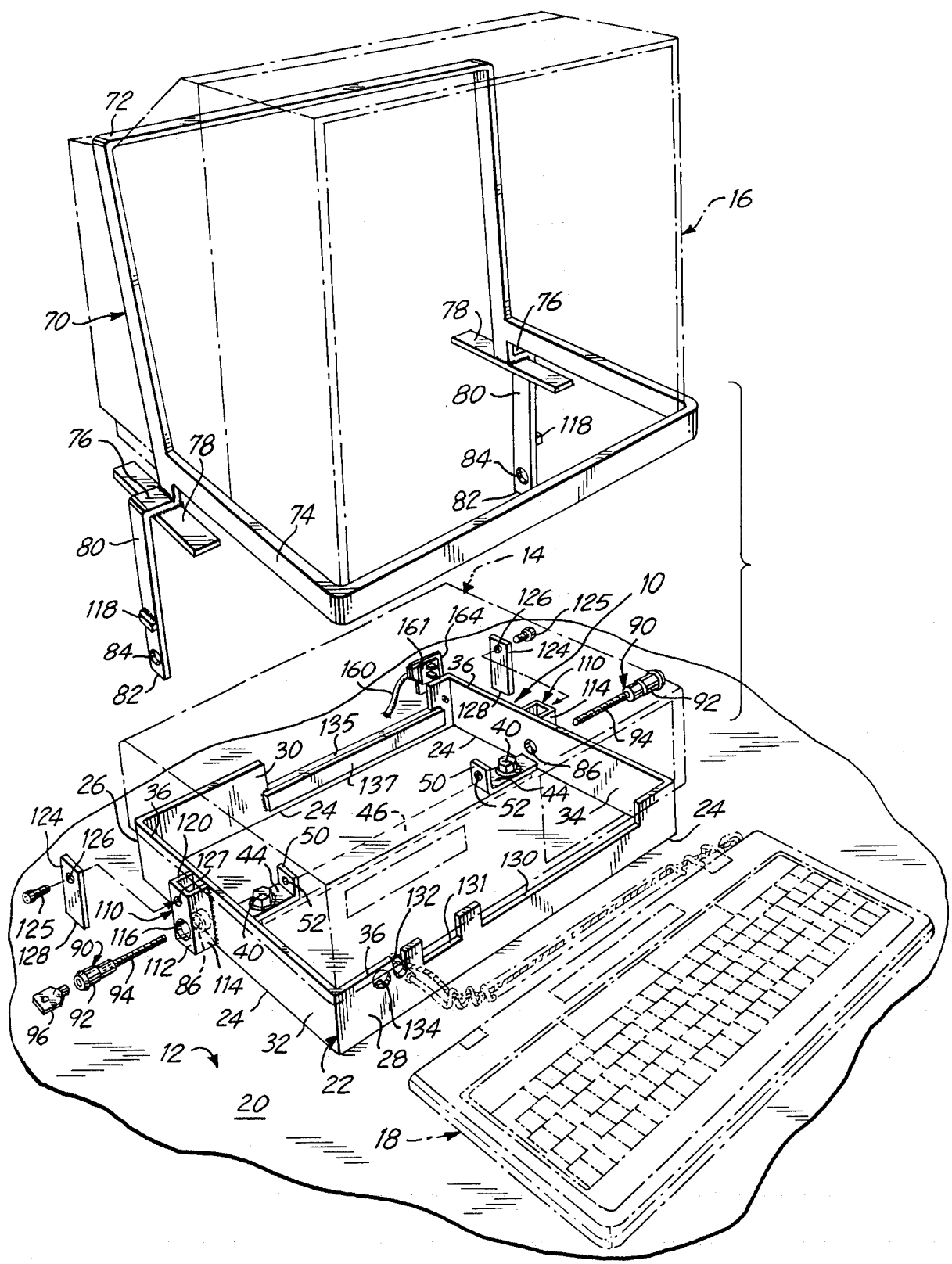
FIG. 1 is an exploded perspective view of an anti-theft device constructed in accordance with the invention.
Figure 2:
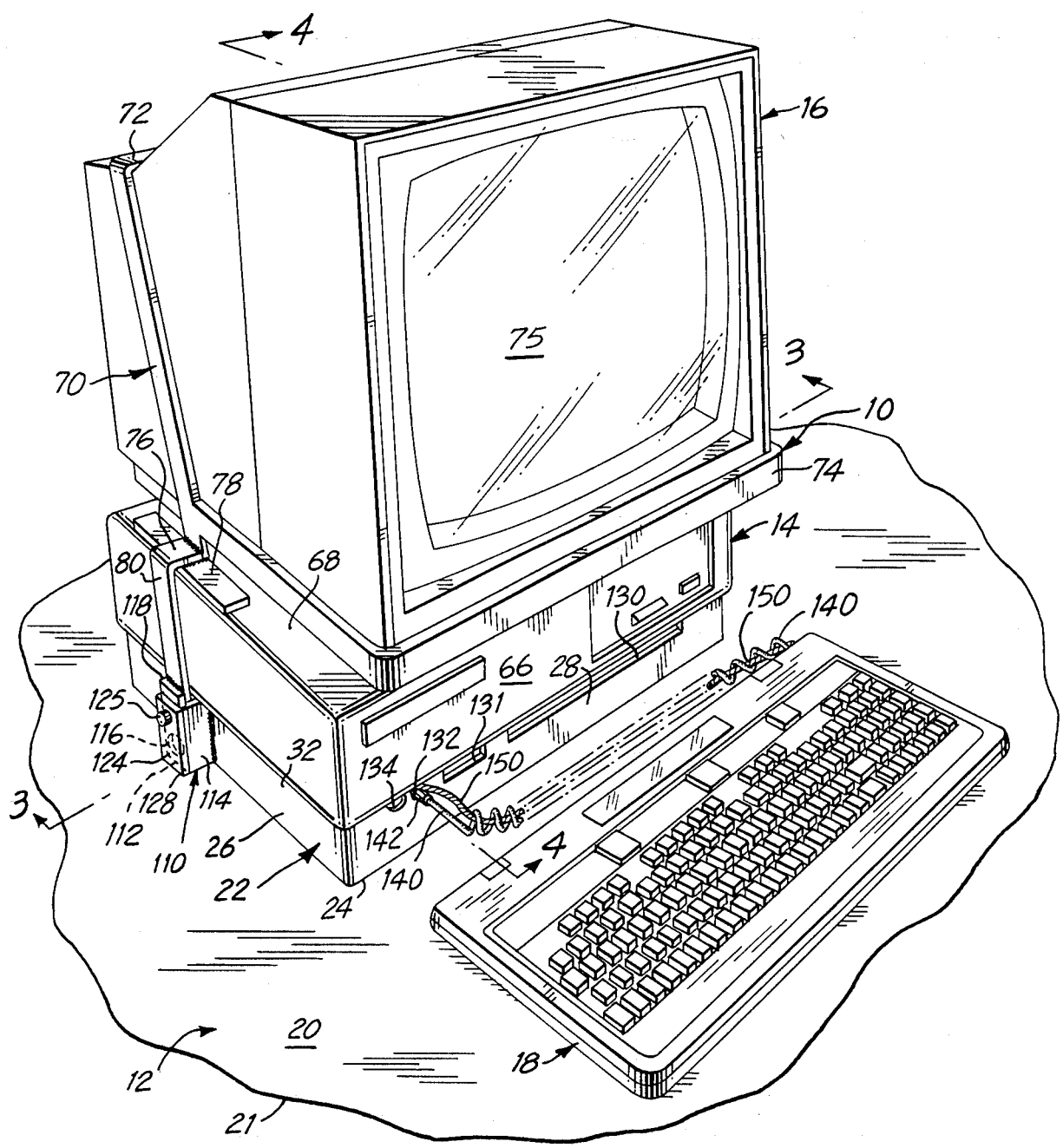
FIG. 2 is a perspective view of the device of FIG. 1 installed so as to secure computer equipment against unauthorized removal from a work station.

Referring now to the drawing, and especially to FIGS. 1 and 2 thereof, an anti-theft device constructed in accordance with the invention is illustrated at 10 and is seen to be installed at a work station 12 for securing electronic equipment against unauthorized removal from the work station 12. The electronic equipment comprises a plurality of computer-related units, including a computer unit 14, a CRT display unit 16 and a keyboard unit 18. Work station 12 includes a work surface 20 upon which the equipment will be placed for operation at the work station, work surface 20 being a part of a table or desk top 21, or the like.

Anti-theft device 10 has a base frame 22 which includes basal surfaces 24 for resting upon the work surface 20. Since the work surface 20 is generally planar, the basal surfaces 24 lie in a basal plane so as to be fully complementary with the work surface 20. Base frame 22 has a generally rectangular plan configuration and includes a peripheral wall 26, having a front wall 28, a rear wall 30, a left side wall 32 and a right side wall 34. In this instance, base frame 22 is provided with support surfaces 36 extending along upper edges of the peripheral wall 26 of base frame 22, spaced upward above lower edges of the peripheral wall 26, which lower edges lie in the basal plane and provide the basal surfaces 24.

Base frame 22 is anchored at the work station 12 by a pair of threaded bolts 40 which pass through bolt holes 42 (see FIG. 3) in cleats 44 affixed to the inside of side walls 32 and 34, and are threaded into a bar 46 placed beneath the work surface 20, at the opposite surface 47 of the table or desk top 21, bar 46 having threaded apertures 48 for receiving the respective bolts 40. Base frame 22 and cleats 44 preferably are constructed of steel and cleats 44 preferably are affixed to side walls 32 and 34 by welding each cleat to the corresponding side wall. Each cleat 44 has a lock tab 50 spaced inwardly from the corresponding side wall 32 or 34, and carrying a threaded aperture 52, all for purposes which will be explained in detail hereinafter.

Figure 3:
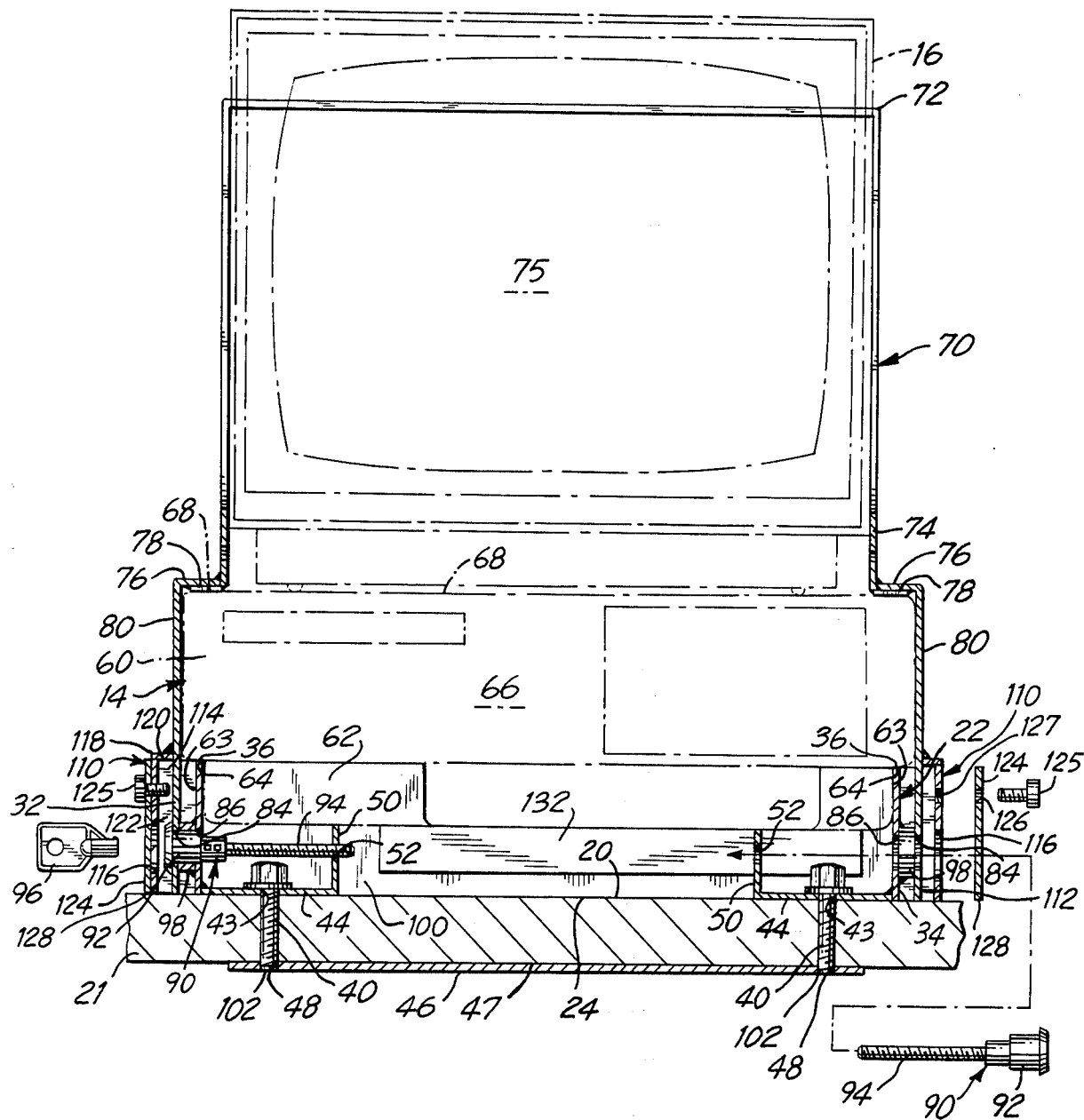
FIG. 3 is a cross-sectional view taken along line 3—3 of FIG. 2.
Figure 4:
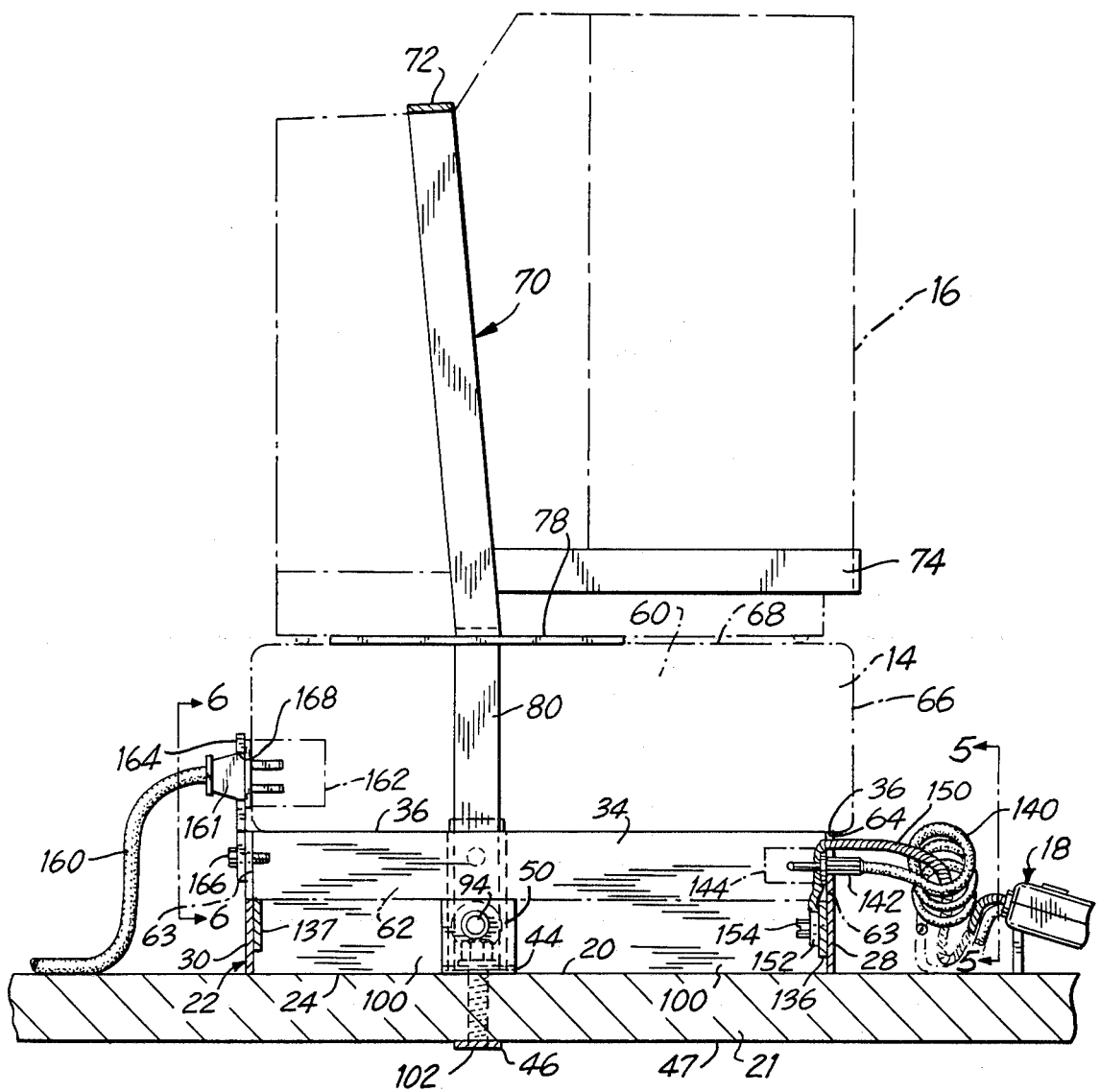
FIG. 4 is a cross-sectional view taken along line 4—4 of FIG. 2.
Figure 6:
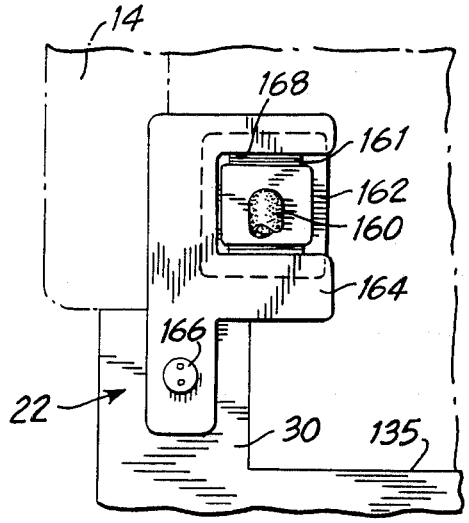
FIG. 6 is a fragmentary rear elevational view of a further portion of the device viewed from line 6—6 of FIG. 4.

Turning now to FIGS. 3 and 4, as well as to FIGS. 1 and 2, computer unit 14 is of the type having a housing 60 with a recessed rectangular base 62. Base frame 22 is constructed for use with computer unit 14 and is dimensioned to receive base 62 of computer unit 14 in a nested position, as shown in FIGS. 3 and 4, as well as in FIG. 2, with the peripheral wall 26 engaging corresponding portions 63 of housing 60 in such a way as to preclude movement of the computer unit 14 relative to base frame 22 in all directions parallel to work surface 20. At the same time, portions 64 of housing 60 rest upon the support surfaces 36 provided by peripheral wall 26 such that base 62 is located above work surface 20 and spaced upwardly therefrom to clear lock tabs 50 of cleats 44. Front panel 66 of computer unit 14 is exposed for use.

The CRT display unit 16 is rested upon upper surface 68 of the housing 60 of computer unit 14 in a vertically stacked array common in computer installations. In order to secure computer unit 14 and CRT display unit 16 in place, a hold-down frame 70 is fitted over the units 14 and 16 and is locked to the base frame 22 as follows. Hold-down frame 70 includes restraining members which are configured complementary to selected securement areas of the computer unit 14 and the CRT display unit 16 so as to engage the selected securement areas and restrain movement of the units 14 and 16 relative to hold-down frame 70. Thus, a vertically-extending, inverted U-shaped member 72 straddles the CRT display unit 16 and engages areas of the unit 16 to preclude upward and rearward movement of unit 16 relative to hold-down frame 70. A horizontally-extending U-shaped member 74 skirts around the front of CRT display unit 16 to preclude forward movement of unit 16 relative to hold-down frame 70. In this manner, all movement of unit 16 relative to hold-down frame 70 is precluded. It is noted that members 72 and 74 engage unit 16 along selected areas to which access is not required during the normal operation of unit 16 so as not to interfere with the regular use of other areas of the unit, such as the screen 75 of the unit. Hence, hold-down frame 70 does not interfere with the ordinary use of the secured equipment.

Hold-down frame 70 further includes laterally-extending members 76 for securing computer unit 14 against upward movement relative to frame 70. Preferably, horizontally-extending stabilizing bars 78 are provided at members 76 and project forward and rearward from members 76 to engage upper surface 68 of housing 60 of unit 14 and preclude rocking of the hold-down frame 70, fore and aft, relative to units 14 and 16.

A pair of legs 80 are integral with the hold-down frame 70 at members 76 and depend therefrom to distal ends 82. Legs 80 are spaced apart laterally to straddle housing 60 of computer unit 14 and extend downwardly to be juxtaposed with side walls 32 and 34 of base frame 22. Each leg 80 has a laterally-extending opening 84 adjacent distal end 82 and each side wall 32 and 34 has a corresponding opening 86 passing laterally through the side walls and aligned with the threaded aperture 52 in tab 50 of corresponding cleat 44. When hold-down frame 70 is fitted properly over units 14 and 16, as seen in FIG. 2, openings 84 and 86 are aligned with one another and with a corresponding threaded aperture 52. Hold-down frame 70 then is secured to base frame 22 with screw-type locking mechanisms 90. Each screw-type locking mechanism 90 includes a lock housing 92 and a threaded shaft 94 capable of being rotated relative to the lock housing 92 only when an appropriate key 96 is inserted into lock housing 92 and turned. Threaded shaft 94 is inserted through aligned openings 84 and 86, engaged with corresponding threaded aperture 52 and advanced until lock housing 92 is seated within opening 84 in leg 80 and aligned opening 86 in side wall 32 or 34. The configuration of lock housing 92 and openings 84 and 86 is such that upon seating of the lock housing in the openings, rotation of the lock housing is precluded and continued rotation of threaded shaft 94 will lock leg 80 securely in place upon base frame 22 to secure hold-down frame 70 against movement relative to base frame 22. A spacing boss 98 is integral with each side wall 32 and 34 and fills the space between each side wall and the corresponding leg 80 to assure that the legs 80 are secured to base frame 22. Screw-type locking mechanism 90 is a commercially available lock unit, modified only to increase the length of threaded shaft 94. One such lock unit is illustrated in U.S. Pat. No. 3,064,086.

Once the locking mechanisms 90 are locked in place at either side of the base frame 22, the computer unit 14 and the CRT display unit 16 are secured against unauthorized removal from work station 12. All movement of the units 14 and 16 relative to base frame 22 and hold-down frame 70 is precluded. Further, all access to the bolts 40 which secure the base frame 22 to the work surface 20 is precluded by virtue of the location of the bolt heads within the secure space 100 defined by the peripheral wall 26 of the base frame 22, between the work surface 20 and the base 62 of the housing 60 of unit 14. Access to bolts 40 from beneath top 21 is precluded by the engagement of the bolts with bar 46, bar 46 also serving to resist attempts to pry base frame 22 upwardly from work surface 20. Access to the cleats 44 and the threaded shafts 94 engaged with threaded apertures 52 in the lock tabs 50 of cleats 44 is precluded by locating these components within the secure space 100. It is noted that the threaded apertures 48 pass completely through bar 46 and enable bolts 40 to pass through bar 46. In this manner, bolts 40 may be supplied with a length sufficient to pass through a top 21 of any one of a range of thicknesses and engage apertures 48. Any excess length of bolts 40 then can be cut off flush with bar 46 at 102 to defeat the ability to turn bolts 40 from beneath top 21 and enable release of the base frame 22. Alternately, bolts 40 can be supplied in precisely the correct length to obtain the desired flush relationship at 102. The flush relationship inhibits the ability to loosen bolts from beneath top 21, as for example, by cutting a slot or other wrenching means in the bolt 40 at 102. Preferably, bolts 40 and bar 46 are constructed of hardened steel to deter such attempts. However, cleats 44 are arranged and constructed so that threaded shafts 94 pass directly over the heads of bolts 40 and preclude sufficient upward movement of bolts 40 to release the bolts, thereby assuring that bolts 40 cannot be released from threaded engagement with bar 46 as long as locking mechanisms 90 are in place. Thus, lock tabs 50 are spaced from each corresponding side wall 32 or 34 a distance sufficient to locate a bolt hole 42 between the lock tab 50 and the side wall of peripheral wall 26 so that threaded shaft 94 will pass over and be juxtaposed with bolt hole 42 and bolt 40.

The juxtaposition of the depending legs 80 in close proximity with the side walls 32 and 34 of base frame 22, coupled with the internal locking arrangement provided by the cleats 44 and screw-type locking mechanisms 90 not only provides a more secure locking system, but enables the locking device to occupy very little of the available work space. Further, the close-fitting components are not amenable to the use of prying tools to separate the hold-down frame 70 from the base frame 22.

In order to provide further protection against prying, wedging and impacting tools, a guard 110 is provided for each screw-type locking mechanism 90. Each guard 110 includes a front shield 112 spaced laterally from a corresponding side wall 32 or 34, and edge shields 114 extending between the front shield 112 and the peripheral wall 26 of base frame 22. Access openings 116 enable the insertion and authorized removal of screw-type locking mechanisms 90, while the shields 112 and 114 preclude access to the seated locking mechanisms 90 by prying, wedging and impacting tools. A further top shield 118 is carried by each of the depending legs 80 and closes access to each locking mechanism 90 through the top opening 120 in guard 110. At the same time, the seating of top shields 118 upon guards 110 aids in the alignment of openings 84 in depending legs 80 with corresponding openings 86 in base frame 22, while the edge shields 114 assist in stabilizing the legs 80 as well as guiding the legs 80 into proper position relative to base frame 22. Preferably, guards 110 are constructed of steel and are welded along the edge shields 114 to the peripheral wall 26 of base frame 22. Sufficient spacing is provided at 122, between each front shield 112 and the corresponding seated locking mechanism 90 to assure that the locking mechanisms 90 cannot be reached by unauthorized removal tools or other damaging implements. As an additional deterrent to minor tampering, cover plates 124 are fitted over the access openings 116, each cover plate 124 being affixed to a front shield 112 by a tamper-proof screw 125 which passes through a hole 126 in the cover plate 124 and is threaded in a threaded hole 127 in the front shield 112, so as to cover access openings 116. The lowermost edge 128 of each cover plate 124 is placed in the basal plane to abut work surface 20 and preclude rotation of cover plate 124 about screw 125 to gain access to access opening 116.

The configuration of base frame 22 and hold-down frame 70 is such that there is no interference with the normal use of computer unit 14 and CRT display unit 16. Thus, access is provided to all of the areas of units 14 and 16 which must be reached during use of the units. To this end, the various members of hold-down frame 70 are configured so as to avoid use areas of the units, such as front panel 66 of computer unit 14 and screen 75 of CRT display unit 16, and engage only selected securement areas. Base frame 22 is provided with notches 130, 131, and 132 and an aperture 134 in the front wall 28 and a notch 135 in the rear wall 30 to provide access for controls and connections. The longer notches 130 and 135 allow for proper ventilation as well. Reinforcement plates 136 and 137 are welded to the inside of front and rear walls 28 and 30, respectively, beneath the notches and aperture to deter the use of cutting or sawing tools which might be passed through the notches or aperture to cut through front wall 28 or rear wall 30.

Figure 5:
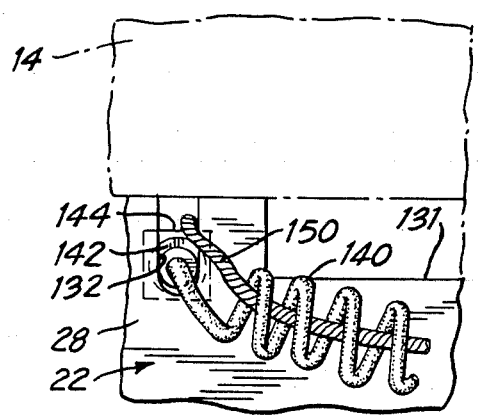
FIG. 5 is a fragmentary front elevational view of a portion of the device, viewed from line 5—5 of FIG. 4.

As best seen in FIGS. 4 and 5, as well as in FIGS. 1 and 2, keyboard unit 18 is connected to computer unit 14 by means of a coiled connecting cable 140 which carries a connector plug 142 for connection with a complementary receptacle 144 in computer unit 14. Notch 132 is located and dimensioned so as to enable cable 140 to pass through front wall 28, but to preclude plug 142 from withdrawal from receptacle 144 when computer unit 14 is properly seated, in nested fashion, in base frame 22. Thus, keyboard unit 18 remains connected to computer unit 14 as long as computer unit 14 is secured within base frame 22. In order to secure keyboard unit 18 further against unauthorized removal, a wire rope 150 is anchored at one end to base frame 22, as by fastening an end fitting 152 to base frame 22 with a removable fastener 154 located within secure space 100 and threaded into reinforcement plate 136, and at the other end within the keyboard unit 18 itself. To this end, the ordinary access screws of the keyboard unit 18 are replaced by tamper-proof fasteners (not shown), after installation of the other end of the wire rope 150. Preferably, wire rope 150 is threaded through the coils of coiled connector cable 140, as shown, so as to remain unobtrusive.

Unauthorized removal of the line cord 160, which has a plug 161 inserted into a complementary receptacle 162 in computer unit 14, is prevented through the use of a supplemental retaining plate 164 secured to the rear wall 30 by a tamper-proof screw 166, as seen in FIGS.

4 and 6. Retaining plate 164 includes a slot 168 through which the line cord 160 passes, but which precludes removal of the plug 161.

Figure 7:
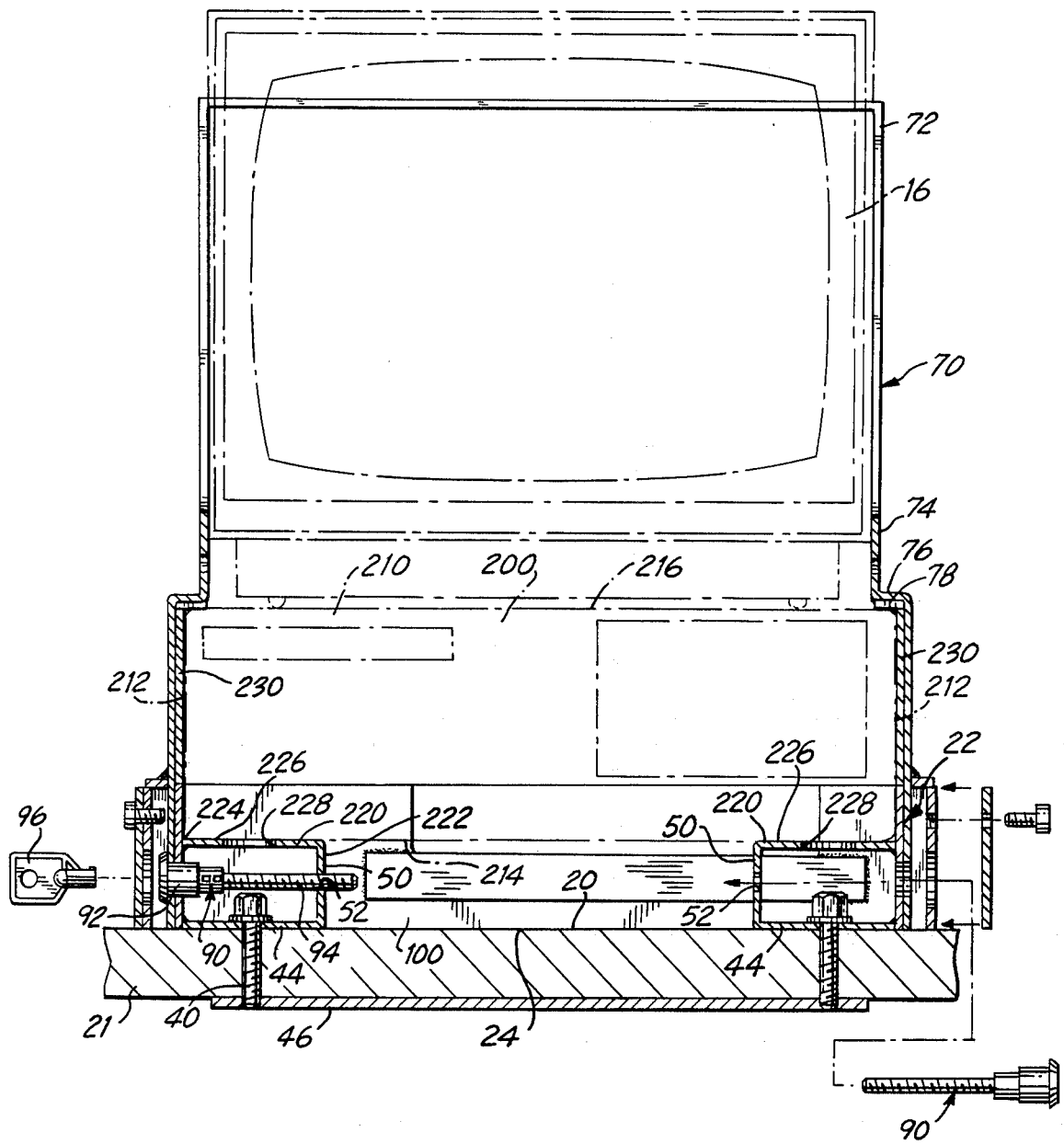
FIG. 7 is a cross-sectional view similar to FIG. 3, but illustrating an alternate construction.

Turning now to FIG. 7, an alternate construction is illustrated for use in connection with a computer unit 200 which, unlike computer unit 14, has a housing 210 with essentially vertical side walls 212 between the bottom 214 and top 216 of the computer unit 200, and does not have a recessed base. In this instance, the peripheral wall 26 of base frame 22 fits around housing 210 so that housing 210 is nested within peripheral wall 26 to preclude movement of the computer unit in directions parallel to work surface 20 of top 21.

In order to support housing 210 of computer unit 200 spaced above top 21, and thereby maintain secure space 100 within the base frame 22, a plurality of supports are affixed to the base frame 22 within the secure space 100, to provide rests for the bottom 214 of computer unit 200. A convenient support construction is illustrated in FIG. 7 wherein each cleat 44 is shown provided with an additional support pad 220 integral with lock tab 50 at one end 222 and welded to peripheral wall 26 at the other end 224. In this manner, support pad 220 not only provides a horizontal support surface 226 for computer unit 200, but reinforces cleat 44, and especially lock tab 50 thereof. An access aperture 228 may be located in support pad 220 for providing access to securing bolt 40, when locking mechanism 90, and threaded shaft 94 thereof, is not present. A plurality of such support pads may be located within the secure space 100 to support the weight of the computer unit 200 and any other units stacked above the computer unit. Preferably, a shim 230 is welded to each leg 80 to fit between the leg and the corresponding side wall 212 of the housing 210 of computer unit 200 so as to prevent the insertion of a prying or wedging tool into that space.

It will be apparent that the locking devices illustrated and described herein are simple in construction and use, yet are highly effective in precluding unauthorized removal of equipment units. At the same time, ordinary use of the equipment is not impeded in any way, and authorized access for repair and replacement is uncomplicated. The use of the base frame 22 combined with the hold-down frame 70 provides an unobtrusive structure, while enabling a greater degree of security. Thus, the arrangement of vertically depending legs 80 placed within guards 110 which shield an internal locking system provided by cleats 44 and locking mechanisms 90 utilizes very little lateral space at the sides of the secured units, while deterring tampering and enabling maximum security. The configuration of the hold-down frame 70 and the base frame 22 enables the stacking of units in a vertical array, which vertical array is common in computer equipment installations, while precluding all movement of these units, which movement could loosen and defeat the securement of the units against unauthorized removal. In addition, the configuration enables separate fabrication of the restraining members and the securing legs of the hold-down frame 70 so that the restraining members are fabricated readily of steel which can be bent to the appropriate shapes, while the legs can be fabricated of relatively straight, highly hardened steel secured to the restraining members by welding. In this manner, the legs will provide a very high degree of resistance to cutting and bending while the restraining members remain economical to fabricate in the various desired configurations.

It is to be understood that the above detailed description of preferred embodiments of the invention is presented by way of example only. Various details of the design and construction may be modified without departing from the true spirit and scope of the invention as set forth in the appended claims.

The embodiments of the invention in which an exclusive property or privilege is claimed are defined as follows:

1. An anti-theft locking device for use primarily in connection with electronic equipment to be secured to a work surface against unauthorized removal, the device engaging the equipment along selected securement areas thereof while enabling access to use areas of the equipment for use of the equipment when secured, the device comprising:

a base frame having basal surfaces for resting upon the work surface, support surfaces spaced above the basal surfaces, and a peripheral wall defining a secure space bounded by the peripheral wall and extending between the basal surfaces and the support surfaces, said support surfaces including support portions complementary to corresponding selected areas of said equipment such that upon placement of the equipment upon the support surfaces of the base frame the corresponding selected securement areas of the equipment will be in a nested position within the peripheral wall, with the peripheral wall precluding movement of the equipment in directions parallel to the work surface;

a hold-down frame for placement over the equipment, the hold-down frame including restraining members generally complementary to further selected securement areas of the equipment while enabling access to said use areas, and at least two depending legs for straddling the equipment and extending downwardly into juxtaposition with the peripheral wall of the base frame when the hold-down frame is in place over the equipment, each said depending leg including a distal end, and a laterally-extending opening adjacent the distal end of at least one of the depending legs;

a threaded aperture aligned laterally with the opening located adjacent the distal end of said one of the depending legs when the depending legs are juxtaposed with the peripheral wall of the base frame;

a screw-type locking mechanism having a lock housing and a threaded shaft rotatable relative to the lock housing, the screw-type locking mechanism being complementary to the opening adjacent the distal end of said one of the depending legs such that upon engagement of the threaded shaft within said threaded aperture, the screw-type locking mechanism will be seated in said opening to secure the hold-down frame to the base frame, thereby precluding release of the equipment from the nested position in the base frame; and anchoring means on the base frame and located within the secure space for anchoring the base frame to the work surface.

2. The invention of claim 1 wherein said threaded aperture is located in a part of the base frame placed within the secure space.

3. The invention of claim 2 wherein said part comprises a cleat integral with the peripheral wall of the base frame and extending laterally into the secure space, and a lock tab integral with the cleat and spaced laterally from the peripheral wall, said threaded aperture being located in the lock tab.

4. The invention of claim 3 wherein the anchoring means includes an anchoring member for engaging the cleat between the peripheral wall and the lock tab such that upon engagement of the threaded shaft of the screw-type locking mechanism with the threaded aperture in the lock tab, the threaded shaft will be juxtaposed with the anchoring member for precluding disengagement of the anchoring member from the cleat.

5. The invention of claim 4 including a support pad extending between the peripheral wall of the base frame and the lock tab and located above the threaded aperture in the lock tab to provide a further support surface for said equipment.

6. The invention of claim 1 including a guard integral with the peripheral wall of the base frame and extending laterally outwardly therefrom, said guard including shields for substantially enclosing said one of the depending legs adjacent the distal end thereof, when said one of the depending legs is juxtaposed with the peripheral wall, to inhibit access to the enclosed leg and the screw-type locking mechanism seated therein, by unauthorized implements.

7. The invention of claim 1 wherein the equipment includes a plurality of units stacked in a vertical array, one above the other, said nested secured areas being located on the lowermost of said units, the hold-down frame including a stabilizing bar integral therewith adjacent each depending leg and extending generally parallel to the basal surfaces and spaced upwardly therefrom for engaging said lowermost unit along upper surfaces thereof.

8. The invention of claims 1 or 7 wherein the equipment includes a further unit remote from the base frame, said anti-theft locking device including a wire rope, capturing means located within the secure space for capturing one end of said wire rope within the secure space, the other end of the wire rope being secured to said further unit.

9. The invention of claim 1 wherein:
each of said depending legs includes a laterally-extending opening adjacent the distal end thereof;
the base frame includes a corresponding laterally-extending opening in the peripheral wall thereof for alignment with the openings in the depending legs when the depending legs are juxtaposed with the peripheral wall of the base frame, and a threaded aperture associated with each said laterally-extending opening in the peripheral wall;
whereby a screw-type locking mechanism is received within the opening in each depending leg and the corresponding openings in the peripheral wall such that screw-type locking mechanisms are seated and secured within the aligned openings in the depending legs and the peripheral wall to secure the hold-down frame to the base frame.

10. The invention of claim 9 including a threaded aperture aligned laterally with each opening in the peripheral wall and located in a part of the base frame placed within the secure space.

11. The invention of claim 10 wherein each said part comprises a cleat integral with the peripheral wall and extending laterally into the secure space, and a lock tab integral with the cleat and spaced laterally from the peripheral wall, said threaded aperture being located in the lock tab.

12. The invention of claim 11 wherein the anchoring means includes an anchoring member for engaging the cleat between the peripheral wall and the lock tab such that upon engagement of the threaded shaft of the screw-type locking mechanism with the threaded aperture in the lock tab, the threaded shaft will be juxtaposed with the anchoring member for precluding disengagement of the anchoring member from the cleat.

13. The invention of claim 12 including a support pad extending between the peripheral wall of the base frame and the lock tab and located above the threaded aperture in the lock tab to provide a further support surface for said equipment.

14. The invention of claim 9 including a guard integral with the peripheral wall of the base frame and extending laterally outwardly therefrom adjacent each of the openings in the peripheral wall, said guard including shields for substantially enclosing the corresponding opening in the peripheral wall and the corresponding depending leg of the hold-down frame adjacent the distal end thereof, when the depending legs are juxtaposed with the peripheral wall, to inhibit access to the enclosed legs and the screw-type locking mechanisms seated therein, by unauthorized implements.

15. The invention of claim 14 wherein each guard includes a front shield spaced laterally from the corresponding juxtaposed depending leg and having an access opening therein aligned with the opening in the depending leg for permitting access to the corresponding screw-type locking mechanism by an authorized key while inhibiting access to the screw-type locking mechanism by an unauthorized implement.

16. The invention of claim 9 wherein the equipment includes a plurality of units stacked in a vertical array, one above the other, said nested secured areas being located on the lowermost of said units, the hold-down frame including a stabilizing bar integral therewith adjacent each depending leg and extending generally parallel to the basal surfaces and spaced upwardly therefrom for engaging said lowermost unit along upper surfaces thereof.

17. The invention of claims 9 or 16 wherein the equipment includes a further unit remote from the base frame, said anti-theft locking device including a wire rope, capturing means located within the secure space for capturing one end of said wire rope within the secure space, the other end of the wire rope being secured to said further unit.

* * * * *